Figure 1:
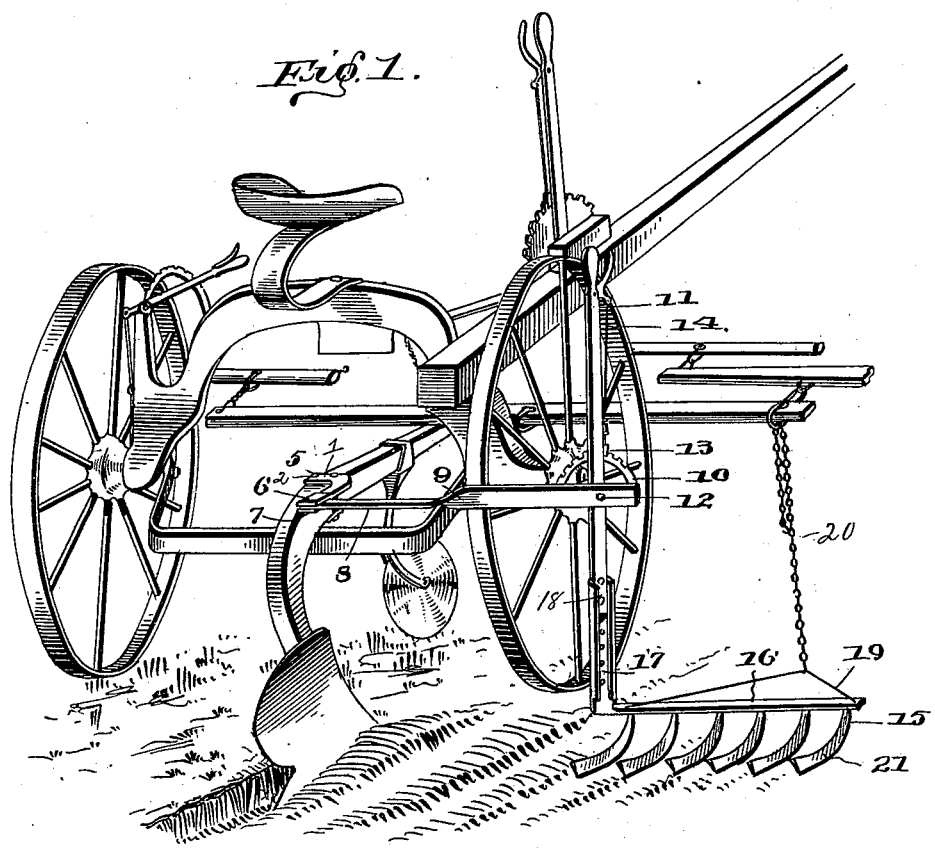

(No Model.)

W. P. DUNLAP.
PULVERIZING ATTACHMENT FOR PLOWS.

No. 602,231. Patented Apr. 12, 1898.

Witnesses
L. C. Hills
Maude Dexter

Inventor
Wm. P. Dunlap
By Glascock & Co.
Attorneys

UNITED STATES PATENT OFFICE.

WILLIAM P. DUNLAP, OF MAQUOKETA, IOWA.

PULVERIZING ATTACHMENT FOR PLOWS.

SPECIFICATION forming part of Letters Patent No. 602,231, dated April 12, 1898.

Application filed June 16, 1897. Serial No. 641,035. (No model.)

*To all whom it may concern:*

Be it known that I, WILLIAM P. DUNLAP, a citizen of the United States, residing at Maquoketa, in the county of Jackson and State of Iowa, have invented a certain new, useful, and valuable Improvement in Pulverizing Attachments for Plows, of which the following is a full, clear, and exact description.

My invention has relation to pulverizing attachments for plows; and it consists in the novel construction and arrangement of its parts, as hereinafter described.

The device as shown in the drawings is especially adapted for sulky-plows; but by a slight modification the device may be made to be attached to walking-plows.

The object of the invention is to provide an attachment which may be easily and readily adjusted to a plow and as easily removed when so desired, the device being supported by a spring arm or bar, and thus having a certain amount of resiliency and adapted when the blades come in contact with obstructions—such as stones, roots, &c.—to prevent the blades from becoming snapped or broken.

The further object of the invention is to provide a means for elevating the pulverizing device when not in use—that is, when the plow is being transferred from one field to another or when making turns.

The further object of the invention is to provide an adjusting mechanism adapted to regulate the perpendicular position of the blades.

Figure 2:
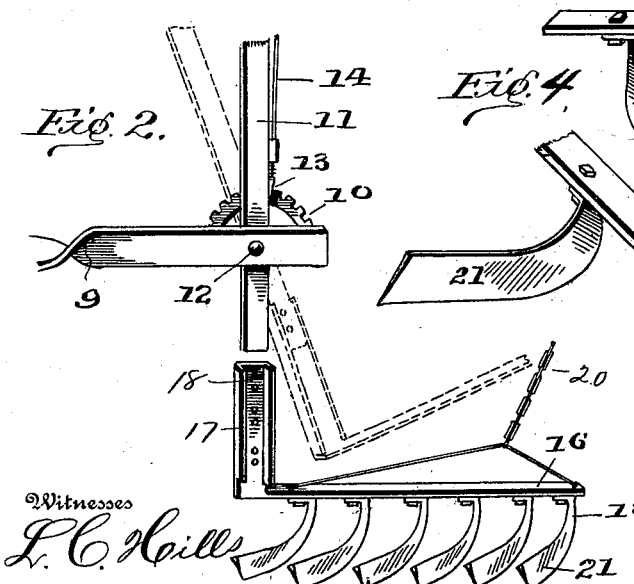
Figure 4:
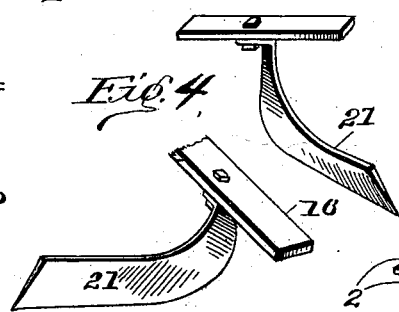
Figure 3:
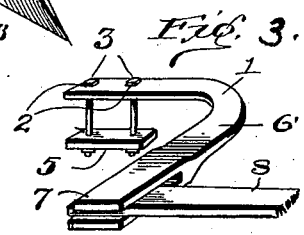

In the accompanying drawings, Figure 1 is a perspective view of the plow with the attachment located thereon. Fig. 2 is a perspective view of the attachment. Fig. 3 is a perspective view of the means for attaching the device to the plow; Fig. 4, perspective views of blades used on the attachment.

The angular piece 1 is provided near one end with the perforations 2 2. Said perforations are adapted to receive the bolts 3 3, the angular piece 1 being adapted to pass over the beam 4 of the plow, the bolts 3 3 passing down each side of the beam 4 and being held at their lower ends by means of the plate 5. The bolts are held by suitable taps of ordinary construction. The section 6 of the piece 1 extends substantially parallel to the beam 4, said sections 6 extending to the rear. The rear end 7 of the said section 6 is bifurcated, and the inner end of the spring-arm 8 is pivoted in said bifurcation. The spring-arm 8 consists of a flat piece of spring metal, the said arm being twisted from a horizontal to a perpendicular position at the point 9. The segment-rack 10 is fixed at or near the outer end of the arm, and the lever 11 is fulcrumed at the point 12 to the spring-arm 8. The pawl 13 is adapted to engage the teeth of the rack 10, and said pawl is adapted to be elevated by the ordinary pawl-rod 14. The blades 15 are secured at their upper ends to the horizontal bar 16. The inner end of said bar is provided with the perpendicular section 17, and said section 17 is adjustably secured to the lower end of the lever 11, as at 18. The bar 16 is provided at its forward edge with the bail 19, and the chain 20 connects said bail 19 with the doubletrees or clevis of the plow.

The blades 15 are preferably provided at their lower ends with the curved sections 21, said sections being twisted to one side. Thus the sections are adapted to scrape along the ground at an angle and to thoroughly pulverize the clods and dirt over which the blades pass. Any number of blades 15 may be provided, and they may be set at suitable intervals on the bar 16. By loosening or shortening the chain 20 the bar 16 and the spring-rod 8 describe an arc of a circle on the pivotal point in the bifurcation 7. Thus the angle at which the blades 15 come in contact with the ground may be varied, and the slanting attachment relative to the plow-body may be varied. By adjusting the section 17 to the lower end of the lever 11 at any suitable height by means of the mechanism located at point 18 the depth at which the blades 15 enter the ground may be regulated.

In passing from one field to another or in making turns the operator seizes the upper end of the lever 11 and depresses the handle to the pawl-bar 14, thus disengaging the pawl 13 from the rack 10, and the bar 16 may be swung up and secured at any desired angle.

Having thus described my invention, what I claim as new, and desire to secure by Letters Patent, is—

An attachment such as described consisting of an angular piece adapted to be secured to the plow-beam, a spring-rod pivoted to said angular piece, a lever fulcrumed to the outer end of said rod, a means for securing said lever in a desired point in its path, a bar carrying a number of blades, said bar being adjustably secured to the end of said lever the blades on said bar adapted to come in contact with the ground, a bail attached to the forward edge of said bar, a flexible connection connecting said bail with a stationary point of the plow.

In testimony whereof I affix my signature in presence of two witnesses.

WILLIAM P. DUNLAP.

Witnesses:
ADAM RINGLEP,
D. C. MIXKLEY.